United States Patent [19]
Cummins

[11] Patent Number: 4,825,894
[45] Date of Patent: May 2, 1989

[54] PIEZOELECTRIC TORQUE MOTOR

[75] Inventor: Richard D. Cummins, Orchard Park, N.Y.

[73] Assignee: Moog, Inc., East Aurora, N.Y.

[21] Appl. No.: 203,949

[22] Filed: Jun. 8, 1988

[51] Int. Cl.⁴ ............................................. G05D 16/00
[52] U.S. Cl. .................................. 137/82; 251/129.06; 251/129.08
[58] Field of Search ....................... 137/82, 83, 625.64; 251/129.06, 129.08; 310/311, 330, 331, 332

[56] References Cited

U.S. PATENT DOCUMENTS

| | | |
|---|---|---|
| 2,471,967 | 5/1949 | Mason ................................. 310/332 |
| 2,931,389 | 4/1960 | Moog et al. ......................... 137/623 |
| 2,964,059 | 3/1960 | Geyer ................................... 137/623 |
| 3,023,782 | 11/1962 | Chaves et al. ....................... 137/623 |
| 3,063,422 | 11/1962 | Gregowski ....................... 137/82 X |
| 3,095,906 | 3/1963 | Kolm ............................... 137/625.62 |
| 3,152,612 | 10/1964 | Avery ........................ 251/129.06 X |
| 3,455,330 | 5/1969 | Williams et al. ..................... 137/596 |
| 3,464,318 | 11/1969 | Thayer et al. ......................... 91/359 |
| 3,524,474 | 10/1970 | McCormick . |
| 3,542,051 | 11/1970 | McFadden et al. .................. 137/83 |
| 3,612,103 | 7/1971 | Williams et al. ..................... 137/596 |
| 4,022,166 | 5/1977 | Bart . |
| 4,441,526 | 11/1984 | Taft et al. . |
| 4,492,246 | 3/1985 | Prescott et al. ...................... 137/85 |

OTHER PUBLICATIONS

Technical Bulletin 103, "Transfer Function for Moog Servovalves", Moog Inc. (1965).
Blockburn et al., "Fluid Power Control", The M.I.T. Press, (4th Printing 1972, [p.323]).
Pysics International Co., Publication (Date Unknown).

*Primary Examiner*—Alan Cohan
*Attorney, Agent, or Firm*—Sommer & Sommer

[57] ABSTRACT

A piezoelectric torque motor (10) includes a body (11), a pair of opposed nozzle assemblies (12,13) mounted on the body, a pair of piezoelectric actuators (14,15) extending upwardly away from the body, and a lever assembly (16) having an upper portion (95) engaging the upper ends of the actuators and having depending leg portions (96,98). A foot plate (94) is mounted on the lower marginal end portions of the lever legs, and is positioned between the nozzles. The piezoelectric actuators are supplied with differential voltages to cause swinging movement of the lever assembly between the nozzles. The improved torque motor may be used in the first- or pilot-stage of a two-stage electrohydraulic servovalve.

12 Claims, 4 Drawing Sheets

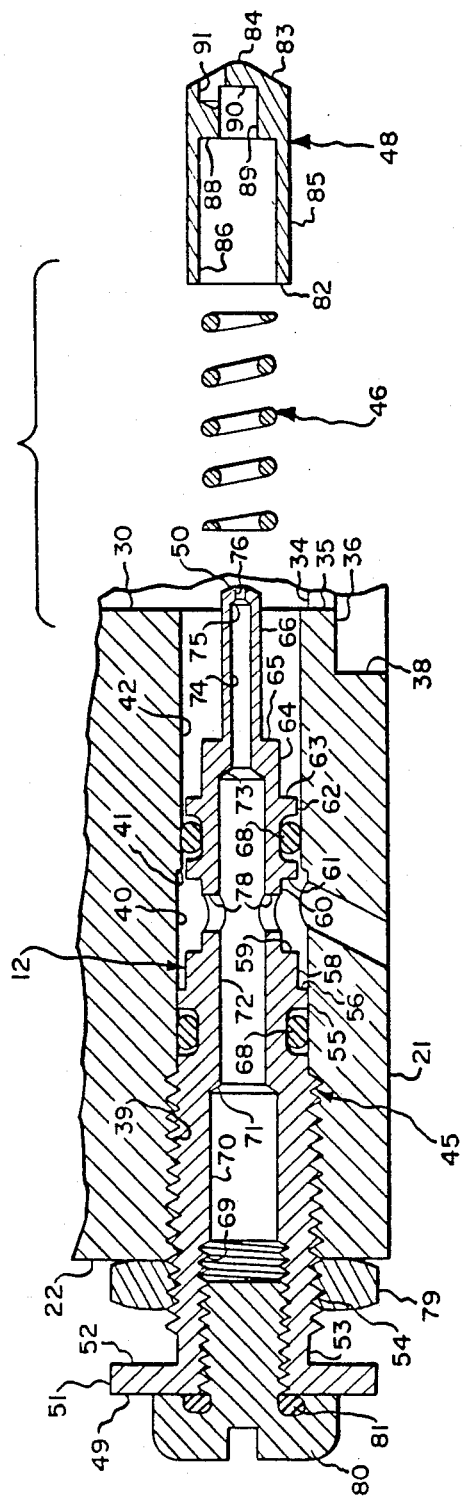

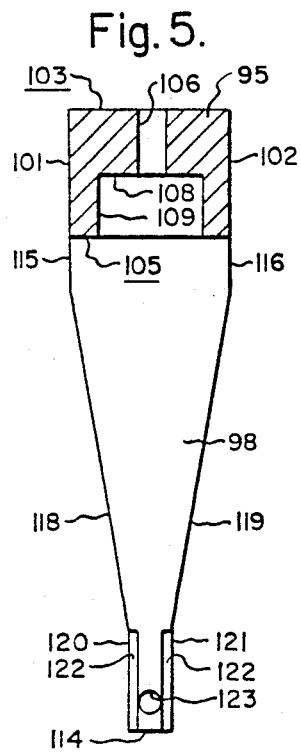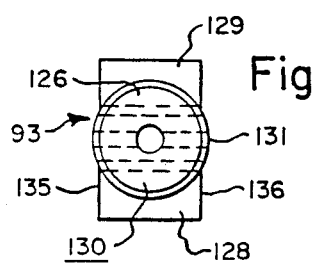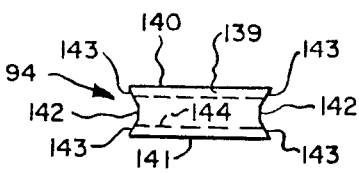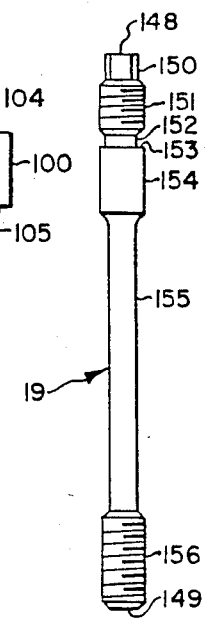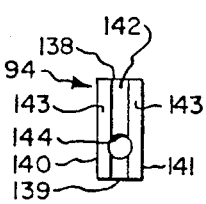

4,825,894

1

PIEZOELECTRIC TORQUE MOTOR

TECHNICAL FIELD

This invention relates generaly to the field of torque motors for producing torque in proportional response to a variable electrical signal, and, more particularly, to an improved torque motor which is particularly suited for use in association with the first- or pilot-stage hydraulic amplifier of a two-stage electrohydraulic servovalve.

BACKGROUND ART

From a functional point-of-view, an electrohydraulic servovalve is a device for converting an electrical signal into a hydraulic output. These servovalves are often employed in larger control systems, and it is generally desirable to have the hydraulic output be substantially proportional to the elctrical input.

Within the broad family of servovalves, there are many different types and species, each offering unique operating characteristics and features. For example, in a "flow control" valve, flow is substantially proportional to the supplied electrical current at constant load. In a "pressure control" valve, a different pressure output is substantially proportional to such supplied current. A "pressure-flow" (PQ) control valve has hybrid or intermediate properties. A "dynamic pressure feedback" (DPF) valve functions as a "pressure control" valve under dynamic conditions, but as a "flow control" valve under static conditions. Other types include "static load error washout" (SLEW) valvesl, and "acceleration switching" (AS) valves. These various types of valves are comparatively illustrated and described in Technical Bulletin 103. "Transfer Functions for Moog Servovalves", Moog Inc. (1965).

All of these different species are of the two-stage typek in that a first- or pilot-stage is used to control the operation of a second- or output-stage. The first-stage typically includes a torque motor, which positions a flapper between two opposed nozzles in response to the magnitude and polarity of an electrical current supplied to the coil(s) of the torque motor. The position of the flapper relative to the nozzles is used to create a differential pressure, which is then used to selectively shift a second-stage valve spool relative to a body. Additional details of such servovalves and torque motors employed therein, are shown and described in U.S. Pat. Nos. 2,931,389, 2,964,059, 3,023,782, 3,095,906, 3,455,330, 3,612,103, 3,542,051, and 3,464,318, the aggregate disclosures of which are hereby incorporated by reference.

There is an every-increasing need to improve the performance of such servovalves. In torque motors which have been developed heretofore, an electrical current is supplied to a coil to produce a magnetic field which acts on an armature. However, there is an inductive lag during which the coil develops the magnetic field in response to the supplied current. This lag, or time delay, either alone or in combination with other factors, reduces the dynamic response of the torque motor, and hence that of the valve and any system in which the valve is employed.

Piezoelectric devices and mechanisms are well known. These devices will change dimensionally in response to a supplied voltage. However, such piezoelectric actuators have, upon information and belief, been heretofore regarded as practicably unsuited for widespread use in torque motors and valve actuators, principally because of relatively small magnitude of such dimensional change. See, e.g., Blackburn et al, Fluid Power Control. The M.I.T. Press (4th Printing 1972) [at p. 323]. Thus, such piezoelectric actuators have been largely limited to the types and applications disclosed in U.S. Pat. Nos. 4,022,166, 3,524,474, 4,441,526, and 4,492,246.

DISCLOSURE OF THE INVENTION

The present invention provides an improved torque motor (e.g., 10) which is adapted to be supplied with an electrical signal (e.g. a voltage), which torque motor comprises: a body (e.g. 11); two piezoelectric actuators (e.g. 14,15), each of the actuators being elongated along an axis and having a first end engaging the body and having a distal second end; a pivotable lever member (e.g., 16) mounted on the actuator second ends and having a lever portion extending outwardly therefrom; whereby an electrical signal may be supplied to at least one, and preferably both, of the actuators to cause a differential displacement of same and to cause the member and lever to pivot.

Accordingly, the general object of the invention is to provide an improved piezoelectric torque motor.

Another object is to provide an improved torque motor for use in the first- or pilot-stage of a two-stage electrohydraulic servovalve.

Still another object is to provide an improved torque motor which is compact, reliable, and which has a minimum of friction-introducing moving parts.

These and other objects and advantages will become apparent from the foregoing and ongoing written specification, the drawings, and the appended claims.

BRIEF DESCRIPTION OF THE DRAWINGS

FIG. 3 is an enlarged partially-exploded view of the left nozzle assembly, this view being taken within the indicated block of FIG. 1.

FIG. 4 is a fragmentary transverse exploded view of the lever assembly, this view showing the lever member, the flexure member, and the foot plate.

FIG. 5 is a fragmentary longitudinal vertical sectional view of the lever member, taken generally on line 5—5 of FIG. 4.

FIG. 6 is a top plan view of the lever member shown in FIG. 4.

FIG. 7 is a fragmentary longitudinal vertical sectional view of the flexure member, this view being taken generally on line 7—7 of FIG. 4.

FIG. 7A is a top plan view of the flexure member.

FIG. 8 is a bottom plan view of the foot plate shown in FIG. 4.

FIG. 8A is a right side elevational view of the foot plate shown in FIG. 4.

FIG. 9 is a side elevational view of one of the tension posts.

MODE(S) OF CARRYING OUT THE INVENTION

Figure 1:
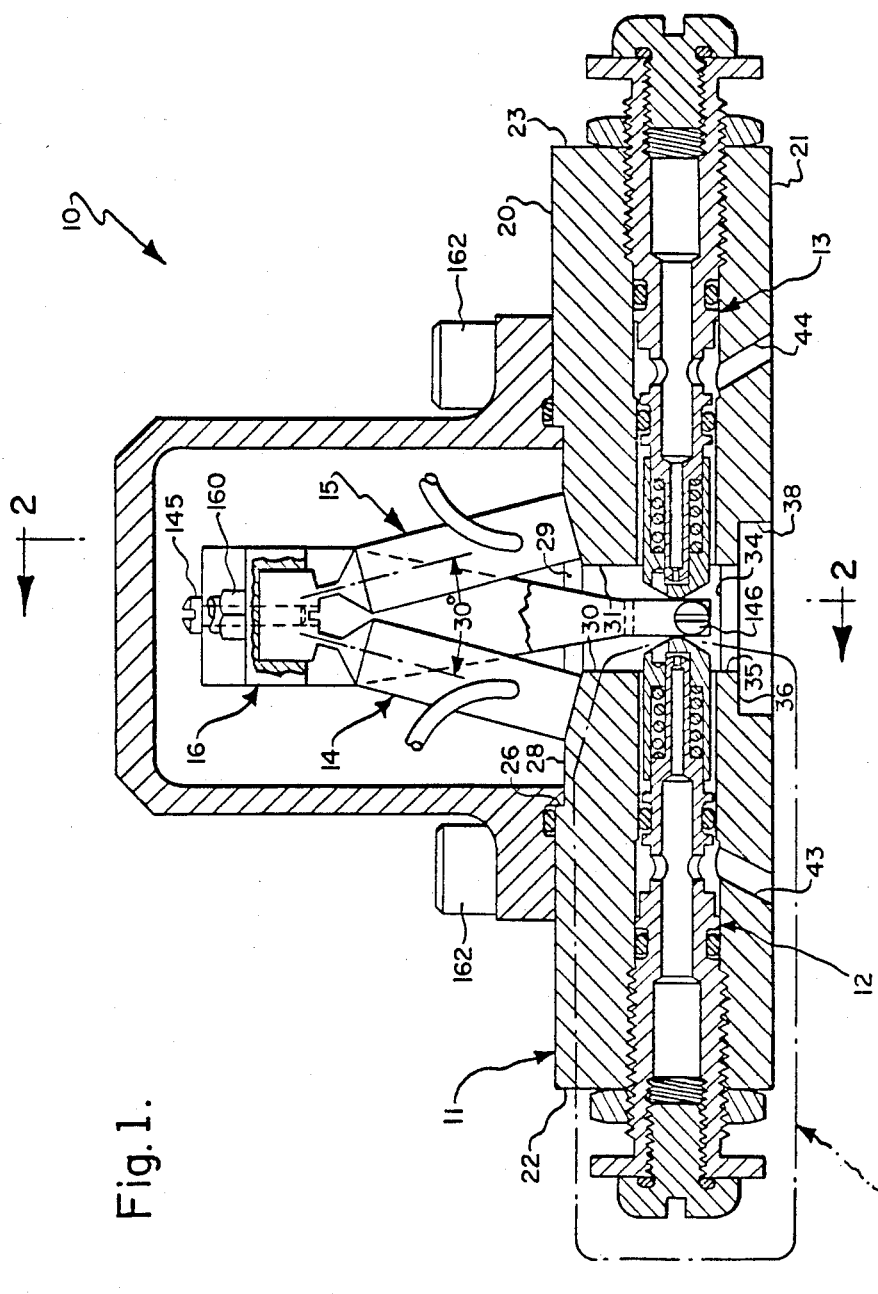
FIG. 1 is fragmentary vertical longitudinal sectional view of one form of an improved torque motor, this view showing the body, the two piezoelectric actuators, the lever assembly, and further showing the lower marginal end portion of the lever member as being operatively arranged between a pair of opposed nozzles.

At the outset, it should be clearly understood that like reference numerals are intended to identify the same structural elements, portions, or surfaces consistently throughout the several drawing figures, such elements, portions, or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply referred to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
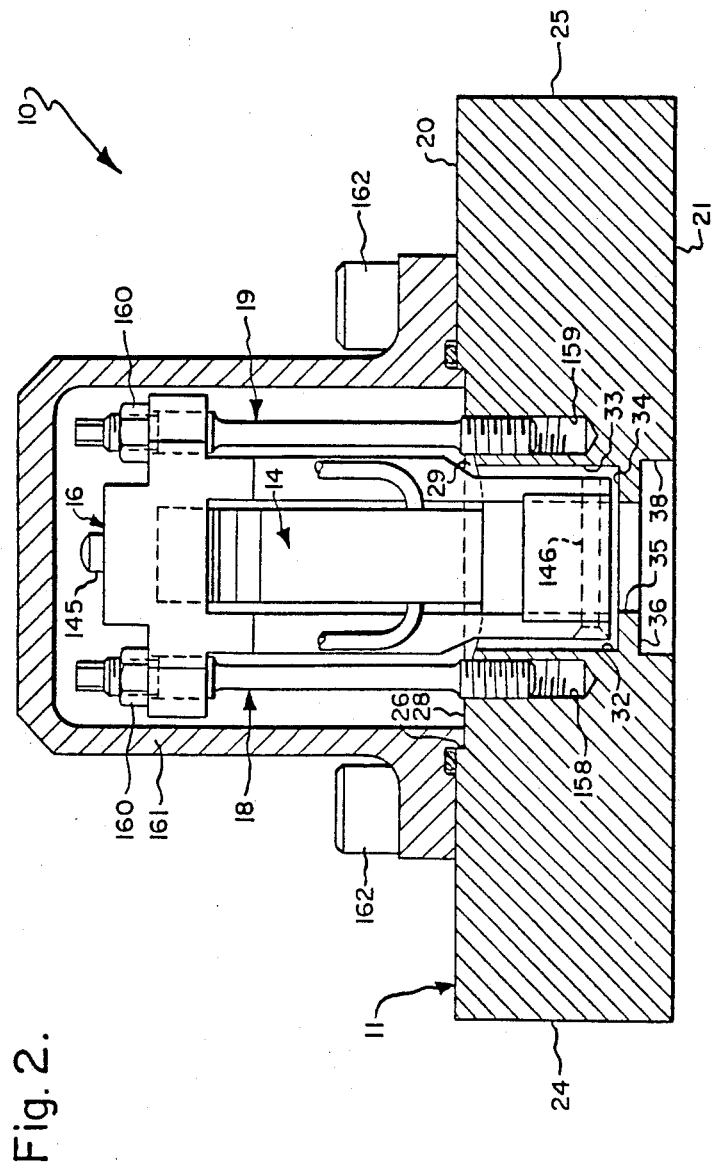
FIG. 2 is a fragmentary transverse vertical sectional view thereof, taken generally on line 2—2 of FIG. 1, and shows the tension posts as being operatively arranged to act between the lever assembly and the body so as to compressively preload the actuators.

Referring now to the drawings, and, more particularly to Figs. 1 and 2 thereof, this invention provides an improved torque motor, of which the presently-preferred embodiment is generally indicated at 10. This motor is shown as broadly including a body 11; a pair of opposed nozzle assemblies 12,13 mounted on the body (FIG. 1); a pair of piezoelectric actuators 14,15 extending upwardly from the body; a lever assembly 16 having an upper portion engaging the upper ends of the actuators and having a depending lever portion position between the nozzles; and a pair of tension posts 18,19 acting between the lever assembly and the body for compressively preloading the actuators (FIG. 2).

The body is shown as being a solid rectangular block-like member, and has horizontal planar upper and lower surfaces 20,21, respectively, separated by transversely-extending left and right planar vertical end faces 22,23, respectively (FIG. 1), and longitudinally-extending planar vertical side surfaces 24,25, respectively (FIG. 2). The body is provided with a central stepped vertical through-passage. This passage is bounded by (from top-to-bottom in Figs. 1 and 2); an inwardly-facing vertical cylindrical surface 26 extending downwardly from upper surface 20; an upwardly-facing annular horizontal surface 28; an upwardly- and inwardly-facing frusto-conical surface 29; a rectangular vertical shaft-like opening bounded by left and right opposed planar transverse surfaces 30,31 (FIG. 1), and lateral opposed planar vertical side surfaces 32,33 (FIG. 2); an upwardly-facing annular horizontal surface 34; an inwardly-facing vertical cylindrical surface 35; a downwardly-facing annular horizontal surface 36; and an inwardly-facing vertical cylindrical surface 38 continuing downwardly therefrom to join body lower surface 21.

Longitudinally-extending horizontal passageways extend into the body to communicate its left and right end faces 22,23 with central opening walls 30,31, respectively. Inasmuch as these two horizontal passageways are arranged as mirror images of one another, only one passageway will be specifically described, it being understood that the same reference numeral will refer to the corresponding portion or surface of the other passageway.

As best shown in FIG. 3, the left body passageway is sequentially bounded by (from left-to-right): an internally-threaded portion 39 extending rightwardly into the body from left end face 22; an inwardly-facing horizontal cylindrical surface 40; a leftwardly- and inwardly-facing frusto-conical shoulder surface 41; and an inwardly-facing horizontal cylindrical surface 42 continuing rightwardly therefrom to join central opening wall surface 30. An upwardly and rightwardly-inclined hole 43 communicates the body lower surface 21 with left passageway surface 40. Conversely, an upwardly- and leftwardly-inclined hole 44 (FIG. 1) communicates body lower surface 21 with the comparable surface of the body right passageway.

As with the left and right passageways, the left and right nozzle assemblies 12,13 are structurally identical, albeit arranged as mirror images of one another. Hence, only the left nozzle assembly will be specifically described, it being again understood that the same reference numeral refers to the corresponding parts, portions or surfaces of the right nozzle assembly.

Adverting now to FIG. 3, left nozzle assembly 12 is shown, in a partially-exploded manner, as including a nozzle body 45, a coil spring 46, and a cap member 48. The nozzle body is a horizontally-elongated tubular member having an annular vertical left end face 49, and a rightwardly- and outwardly facing frusto-conical right end face 50. Its outer surface includes (from left-to-right in FIG. 3): a polygonal surface 51 extending rightwardly from left end face 49, a rightwardly-facing annular vertical surface 52, an outwardly-facing horizontal cylindrical surface 53, an externally-threaded portion 54, an outwardly-facing horizontal cylindrical surface 55, a rightwardly-facing annular vertical surface 56, an outwardly-facing horizontal cylindrical surface 58, a rightwardly-facing annular vertical surface 59, an outwardly-facing horizontal cylindrical surface 60, a leftwardly-facing annular vertical surface 61, an outwardly-facing horizontal cylindrical surface 62, a rightwardly-facing annular vertical surface 63, an outwardly-facing horizontal cylindrical surface 64, a rightwardly-facing annular vertical surface 65, and an outwardly-facing horizontal cylindrical surface 66 continuing rightwardly therefrom to join right end face 50. Annular recesses extend into the nozzle body from surfaces 55,62 to accommodate a pair of O-rings, severally indicated at 68, which seal the joint between surfaces 55,42 and 62,42, respectively.

The nozzle body is also provided with a stepped axial throughbore, which is sequentially bounded by (from left-to-right in FIG. 3): a internally-threaded portion 69 extending rightwardly from left end face 49, an inwardly-facing horizontal cylindrical surface 70, a leftwardly- and inwardly-facing frusto-conical surface 71, an inwardly-facing horizontal cylindrical surface 72, a leftwardly- and inwardly-facing frusto-conical surface 73, an inwardly-facing horizontal cylindrical surface 74, a leftwardly- and inwardly-facing frusto-conical surface 75, and an inwardly-facing horizontal cylindrical surface 76 continuing rightwardly therefrom to join right end face 50. A diametrical through-hole 78 communicates outer surface 60 with inner surface 72. The nozzle body is shown as having been threaded into the left body passageway such that nozzle body surfaces 58,60 and 62,64,66 are arranged to face body surfaces 40 and 42, respectively. By virtue of the mating connection between threaded portions 54,39, the nozzle body may be selectively rotated in the appropriate direction relative to the body to adjustably vary the position of nozzle right end face 50 relative to the null position of the lever foot portion. A nut 79 is threaded on to nozzle threaded portion 54, and may be selectively tightened against body left end face 22 to prevent unintended rotation of the nozzle relative to the body. A cap screw, generally indicated at 80, is shown as having its shank portion threaded into engagement with nozzle body threaded surface 69 so as to sealingly close the left end of the nozzle body through-bore, with an O-ring 81 being compressed between the cap screw and nozzle body left end face 49. Since this cap screw 80 merely functions as a closure for the left end of the nozzle body through-bore, it need not be further described.

Spring 46 is adapted to encircle nozzle body surface 66, and to have its left end act against nozzle body surface 65.

Still refering to FIG. 3, cap member 48 is shown as being a horizontally-elongated tubular member having an annular vertical left end face 82, a rightwardly- and outwardly-facing frusto-conical right end face 83 terminating in a rightwardmost rounded or convex nose 84, and an outwardly-facing horizontal cylindrical surface 85 joining surfaces 82,83. The cap member is provided with an offset through-bore formed by two misaligned holes drilled into the cap member from its opposite end faces. More particularly, the first recess is shown as being bounded by an inwardly-facing horizontal cylindrical surface 86 extending rightwardly into the cap member from left end face 82, a leftwardly-facing annular vertical shoulder surface 88, and an inwardly-facing horizontal cylindrical surface 89 continuing rightwardly therefrom and terminating in a leftwardly-facing substantially-circular vertical bottom surface 90. The second recess is in the form of a horizontal hole 91 drilled leftwardly into the cap member from its right end face from an eccentric position so as to non-axially intersect the first recess. Thus, the flow passage through the cap member is tortuous and somewhat S-shaped.

As shown in FIG. 1, the cap member is adapted to be mounted on a nozzle body such that cap member surfaces 86,89 slidably engage nozzle body surfaces 64,66, respectively, with spring 46 being compressed between nozzle body surface 65 and cap member surface 89. Hence, pressurized fluid supplied through passageway 43 may pass through hole 78 and flow through the nozzle body bore to be discharged through nozzle 76 against cap surface 90. Since spring 46 is compressed, cap member 48 is biased to continuously engage the lever lower marginal end portion. Hence, swinging movement of the lever will cause cap member 48 to move horizontally toward and away from nozzle 76, thereby varying the outlet orifice area between the nozzle and cap surface 90, and hence the back pressure in passageway 43. Such movement of the lever also varies the spacing between the cap member and nozzle of the right nozzle assembly 13 to vary the back pressure in passageway 44. Thus, when the two nozzle assemblies are secured to the main body, such swinging movement of the lever lower marginal end portion causes the areas of the opposed outlet orifices to vary in a reciprocal, supplementary manner (i.e., as the area of one increases, the area of the other decreases, and vice versa).

As best shown in FIGS. 1 and 2, each piezoelectric actuator 14, 15 is a stack of individual cyrstals (not separately shown), preferably made of quartz or the like. In the preferred embodiment, each crystal is rectangular in transverse cross-section (i.e., about $2 \times 3$ mm). The crystals are placed on top of one another so as to form a stack of crystals, and are mechanically connected in series but electrically connected in parallel. In the preferred embodiment, the two actuator stacks are identical with respect to both dimensions, numbers of crystals, and crystal material. Moreover, the actuators are shown as having their lower end faces arranged to engage body surface 29 such that the axes of the stacks are upwardly- and inwardly-inclined at an acute included angle of about 30°. The two stack axes are arranged in a vertical plane which includes the horizontal axes of the left and right nozzle assemblies 12,13. However, this arrangement, while presently preferred, is not invariable. If desired, the axes of the two crystal stacks could be parallel to one another. Indeed, more than two actuator stacks could be provided.

Referring now principally to FIG. 4, lever assembly 16 is shown as including a lever member 92, a flexure member 93, and a foot plate 94. As best shown in FIGS. 4-6, lever member 92 is vertically-elongated and specially-configured so as to have an uppermost portion 95 from which two horizontally-spaced left and right leg portions 96,98 depend. The head portion has planar vertical left and right end faces 99,100, and planar vertical side surfaces 101, 102, joined by intermediate bevelled surfaces. The head portion has an uppermost planar horizontal rectangular surface 103 spaced vertically above lateral coplanar horizontal flange upper surfaces, separately indicated at 104, and a planar horizontal flange lower surface 105, from which the two leg portions hang. A stepped vertical recess is provided through the head portion. This recess is bounded by an inwardly-facing vertical cylindrical surface 106 extending downwardly from upper surface 103, a downwardly-facing annular horizontal shoulder 108, and an inwardly-facing vertical cylindrical surface 109 continuing downwardly therefrom to join lower surface 105. The two leg portions are arranged as mirror images of one another, when seen in transverse cross-section (FIG. 4), and are symmetrical about a vertical axis when seen in longitudinal cross-section (FIG. 5). Thus, as shown in FIG. 4, each leg has a planar vertical inner surface 110 extending downwardly from surface 105 and arranged to face the like surface of the other leg, and has an outwardly-facing surface which sequentially includes a planar vertical upper surface 111 extending downwardly from surface 105, a downwardly- and outwardly-inclined planar surface 112, and a planar vertical surface 113 continuing downwardly therefrom to join the planar horizontal distal end surface 114 of the leg. When seen in elevation (FIG. 5), each leg has a pair of left and right planar vertical surfaces 115,116 extending downwardly from head portion side surfaces 101,102, respectively, a pair of downwardly- and inwardly-inclined tapered left and right planar surfaces 118,119, respectively, and left and right planar vertical surfaces 120,121, respectively, continuing downwardly therefrom to join lower end surface 114. The edges between surfaces 110,120 and 110,121 are shown as being bevelled, as severally indicated at 122. Moreover, a horizontal hole 123 is shown as having been drilled through the lower marginal end portions of each leg. The hole portion provided through leg 96 is shown as being tapped, while the hole portion provided through right leg 98 is shown as having a recessed portion to accommodate the head of a fastener. As best shown in FIG. 4, the laterally-extending left and right flanges of the head portion are provided with vertical through-holes 124,125, respectively.

Referring now to FIGS. 4, 7, and 7A, the flexure member 93 is shown as being specially-configured, and has an uppermost head portion 126 from which two leg portions 128,129 extend downwardly and longitudinally outwardly. The head portion has a horizontal circular upper surface 130, and an outwardly-facing vertical cylindrical side surface 131. The head portion is also provided with a central vertical tapped through-hole 132. The two leg portions 128,129 are formed integrally with the head portion, and depend from head portion underside surface 132 at an acute included angle of about 30°. Each leg portion is shown as terminating in a lowermost planar rectangular foot surface 133, and as being connected to the head portion by an intermediate thin-walled flexible rectangular web portion 134. As shown in FIGS. 7 and 7A, the two leg portions extend between a left face 135, and a right face 136. The thin-walled web portion therefore allows substantially-frictionless pivotal movement of the leg portion relative to the head portion.

The foot plate 94 is a vertically-elongated member having planar horizontal upper and lower surfaces 138,139, and planar rectangular side surfaces 140,141, respectively. As best shown in FIG. 7, the left and right end faces of plate member 94 are shaped complimentarily with respect to the inwardly-facing lower marginal end surfaces of the lever leg portions. Thus, each end face has a central vertical rectangular surface 142, from which bevelled surfaces 143 extend outwardly to join the margins of side faces 140,141. The foot plate is further provided with a horizontal through-hole 144 between surfaces 142,142, which is adapted to register with lever leg portion holes 123.

The lever is assembled by first inserting flexure member head portion 126 into the downwardly-facing recess provided in the lever head portion. Thus, flexure member surfaces 130,131 are arranged to face lever member surfaces 108,109, respectively. The flexure member may be retained in this position by means of a fastener 145, as shown in FIG. 1. Foot plate 94 is then slipped upwardly between the lower marginal end portions of the lever member legs, the dovetail connection therebetween facilitating such insertion, until holes 123,144 are aligned with one another. A fastener 146 is passed through such aligned holes such that the head of the fastener will be received in the complimentarily-shaped recess provided in right leg portion 98, and the marginal end portion of its externally-threaded shank will be matingly received in the tapped hole provided in the lever left leg portion. Thereafter, the lever assembly 16 is mounted such that flexure member foot surfaces 133,133 fully engage the upper or second distal end faces of actuators 14,15. The lever assembly is held in this position by means of tension posts 18,19. Since these posts are structurally identical, only one will be specifically described.

Referring now to FIG. 11, post 19 is shown as being a vertically-elongated solid rod-like member having a hexagonal horizontal upper face 148, and a circular lower face 149. The outer surface of the post sequentially includes (from top-to-bottom in FIG. 11): a hexagonal side surface 150 extending downwardly from upper face 148 and which is adapted to be engaged by a suitable turning tool (not shown), an externally-threaded surface 151, a narrowed cylindrical neck surface 152, an upwardly-facing annular horizontal surface 153, an vertical cylindrical surface 154, a radially-narrowed vertical cylindrical surface 155, and an externally-threaded portion 156 continuing downwardly therefrom to join lower face 149. The threaded lower marginal end portions of posts 18,19 are adapted to be mainly received in tapped blind holes 158,159 provided in the body on either side of the recess (FIG. 2). The upper marginal end portions of these posts are passed through flange holes 124,125. Thereafter, nuts 160 are threaded onto the upper ends of the posts, and are selectively tightened to compressively sandwich the piezoelectric actuators between the lever assembly and the body. This preloads the actuators.

Adverting now to FIG. 1 and 2, the actuators and the lever assembly are shown as being enclosed within an inverted cup-shaped protective cap 161, which is adapted to be mounted on the body by means of fasteners 162.

The improved device may be operated by supplying an initial like voltage to both actuators. Thereafter, the voltage supplied to one actuator may be increased incrementally, while the voltage supplied to the other may be incrementally decreased by a like amount. In other words, the actuators are preferably operated differentially about an initial voltage, thereby to cause pivotal movement of the lever assembly. As such pivotal movement occurs, the flexure member webs permit substantially-frictionless pivotal movement of the lever assembly relative to the actuators. Because of the different lengths of the lever, a motion amplification occurs at the foot plate portion between the nozzles. In the preferred embodiment, that motion amplification is about 13.3:1. Thus, by varying the voltages supplied to the actuators, the foot plate may be caused to pivotally swing between the two nozzles. As previously noted, this can be used as the first- or amplifier-stage of a two-stage electrohydraulic servovalve, such as shown in U.S. Pat. No. 3,023,782, with the back pressures developed in passageways 43,44 being used to selectively displace the secondstage spool relative to the body in which it is mounted.

Since the actuators are structurally identical, the device is insensitive to thermal gradients entering the torque motor from the body (i.e., upwardly in FIGS. 1 and 2). In other words, each piezoelectric actuator will expand or contract, as appropriate, equally in response to such thermal gradient without producing a net effect on the orifice areas of the two nozzle assemblies.

Modifications

The present invention contemplates that many changes and modifications may be made.

For example, the invention defined by the appended claims is not limited to use in a two-stage electrohydraulic servovalve. Thus, nozzle assemblies 12,13 are optional. Secondly, while the invention contemplates that there be at least two actuators, there certainly can be more if desired. These need not necessarily be upwardly- and inwardly-inclined, as shown, but may be parallel to one another if desired. Indeed, multiple pairs of actuators may be closely arranged and staggered with respect to one another. While flexure member 93 is preferred because webs 134 offer the feature of substantially-frictionless pivotal movement, an alternative ball-and-socket connection, or the like, could alternatively be employed. The actuators need not be supplied with differential voltages about an initial value. Indeed, one stack can be selectively extended or retracted relative to the other, as desired. However, if operated differentially, they need not only be supplied with equal increments about an initial voltage.

In the preferred embodiment, the lever leg portions are shown as depending from the lever head portion so as to substantially bisect the angle of inclination between the two actuator axes, when the lever is in a null or centered position between the nozzles. However, it should be clearly understood that this is only because the illustrated embodiment adapted for use in an electrohydraulic servovalve. Indeed, in some alternative application, the lever could extend outwardly from the head position at any angle. Hence, the invention is not limited to having a downwardly-extending lever.

Therefore, while a preferred embodiment of the improved piezoelectric torque motor has been shown and described, and several modifications thereof discussed, a person skilled in this art will readily appreciate that various additional changes and modifications may be made without departing from the spirit of the invention, as defined and differentiated by the following claims.

I claim:

1. A torque motor for an electrohydraulic servovalve, said torque motor being adapted to be supplied with a suitable electric signal, comprising:
   a body;
   two piezoelectric actuators, each of said actuators being elongated along an axis and having a first end engaging said body and having a second end;
   preload means for compressing said actuators;
   a flexure member having first portions engaging said actuator second ends, having a second portion, and having intermediate flexible web portions connecting said first portions to said second portion, each of said web portions permitting substantially-frictionless relative pivotal movement between said second portion and the associated first portion; and
   a lever assembly mounted on said member second portion;
   whereby an electrical signal may be supplied to at least one of said actuators to cause said member and lever assembly to pivot relative to said body.

2. A torque motor set forth in claim 1 wherein said actuators are operated differentially.

3. A torque motor as set forth in claim 1 wherein said actuators are supplied with an initial electrical signal, and wherein said member first and second portions are caused to pivot relative to one another by increasing the initial signal supplied to one actuator and by decreasing the signal supplied to the other actuator by a like amount.

4. A torque motor as set forth in claim 1 wherein said actuator axes are inclined toward one another in a direction away from said body.

5. A torque motor as set forth in claim 4 wherein the angle of inclination between said axes is about 30 degrees.

6. A torque motor as set forth in claim 4 wherein said lever assembly substantially bisects the angle between said axes when equal signals are supplied to said actuators.

7. A torque motor as set forth in claim 1, and further comprising:
   at least one nozzle mounted on said body, and wherein said lever assembly is arranged to move toward and away from said nozzle to vary the outlet area through which fluid may flow.

8. A torque motor as set forth in claim 1 and further comprising:
   a pair of opposed nozzles mounted on said body, and wherein said lever assembly is arranged to move toward and away from at least one of said nozzles.

9. A torque motor as set forth in claim 8 wherein said lever assembly is substantially centered between said nozzles when equal signals are supplied to said actuators.

10. A torque motor as set forth in claim 1 wherein said actuators are substantially identical to one another.

11. A torque motor as set forth in claim 7 wherein said nozzle is adjustably positioned on said body.

12. A torque motor as set forth in claim 7 and further comprising:
   a cap member mounted for movement relative to said nozzle; and
   a spring acting between said body and cap member for urging said cap member to continuously contact said lever assembly.

* * * * *